United States Patent
Bech

(10) Patent No.: US 8,823,192 B2
(45) Date of Patent: Sep. 2, 2014

(54) WIND TURBINE CONTROL FOR A WEAK GRID BY REDUCING ACTIVE POWER OUTPUT

(71) Applicant: John Bech, Hammel (DK)

(72) Inventor: John Bech, Hammel (DK)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/889,414

(22) Filed: May 8, 2013

(65) Prior Publication Data

US 2013/0300118 A1     Nov. 14, 2013

(30) Foreign Application Priority Data

May 9, 2012   (EP) ..................................... 12167315

(51) Int. Cl.
    *F03D 9/00*       (2006.01)
(52) U.S. Cl.
    USPC ............................................. 290/44; 290/55
(58) Field of Classification Search
    USPC .............................................. 290/43, 44, 55
    See application file for complete search history.

(56) References Cited

U.S. PATENT DOCUMENTS

| | | | | |
|---|---|---|---|---|
| 7,755,209 B2 * | 7/2010 | Jones et al. | ...................... | 290/44 |
| 7,859,125 B2 * | 12/2010 | Nielsen et al. | .................. | 290/44 |
| 7,902,686 B2 * | 3/2011 | Andersen et al. | ............... | 290/44 |
| 7,911,072 B2 * | 3/2011 | Nyborg | ........................... | 290/44 |
| 8,180,498 B2 * | 5/2012 | Zhu et al. | ...................... | 700/287 |
| 8,258,642 B2 * | 9/2012 | Koerber | .......................... | 290/44 |
| 8,618,694 B2 * | 12/2013 | Santos et al. | .................. | 307/102 |
| 8,664,788 B1 * | 3/2014 | Wagoner et al. | ................. | 290/44 |

FOREIGN PATENT DOCUMENTS

| | | |
|---|---|---|
| GB | 2410386 A | 7/2005 |
| WO | WO 2011050807 A2 | 5/2011 |
| WO | WO 2012022353 A2 | 2/2012 |

* cited by examiner

*Primary Examiner* — Nicholas Ponomarenko

(57) ABSTRACT

A method is provided for controlling a wind turbine connected to a node connected to a utility grid. The node also has a plurality of other wind turbines connected to it. The method includes measuring a quantity indicative of a slope of a voltage at the node in dependence of active power delivered to the node, determining that the slope is smaller than a negative slope limit, and performing a measure, in order to increase the slope above the slope limit.

18 Claims, 4 Drawing Sheets

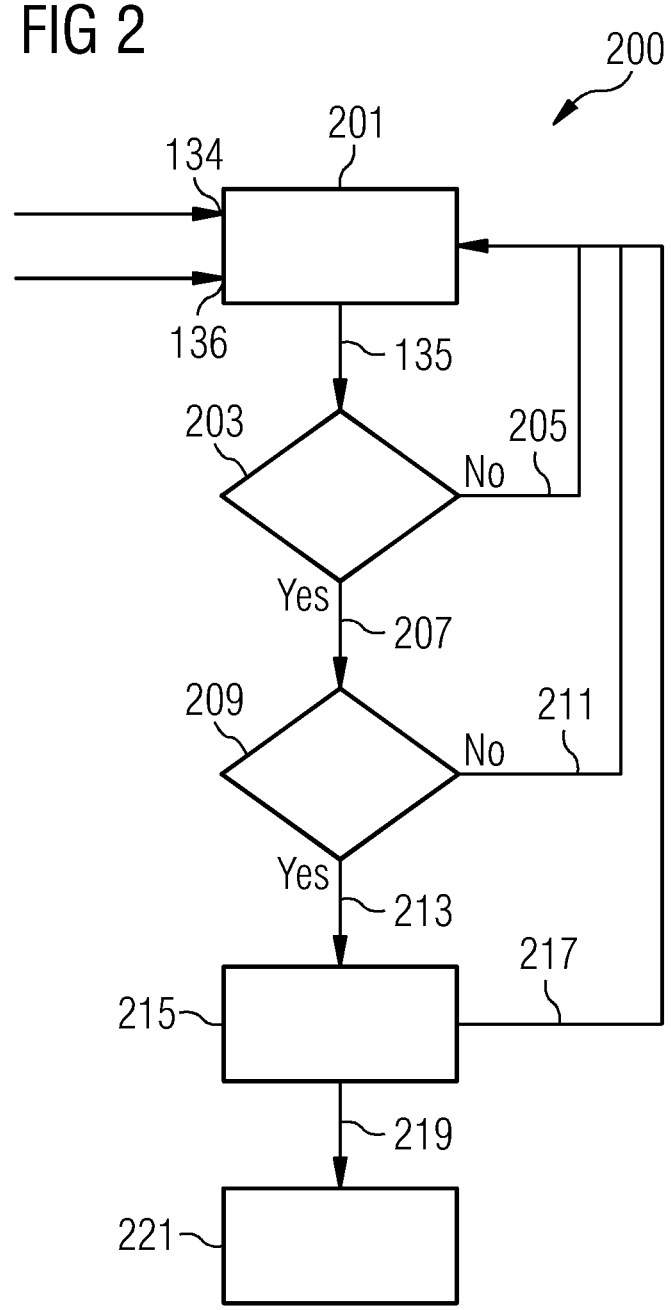

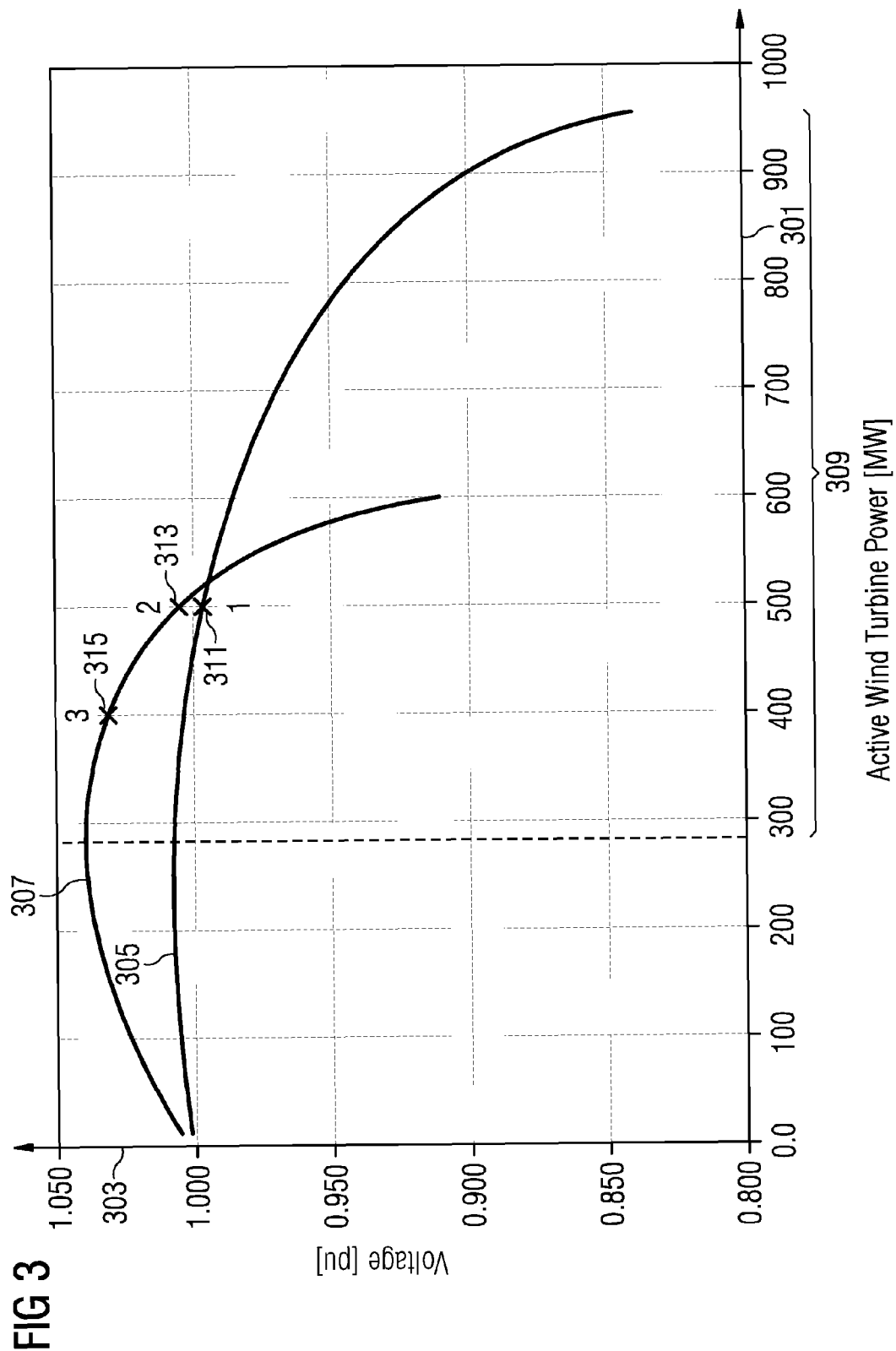

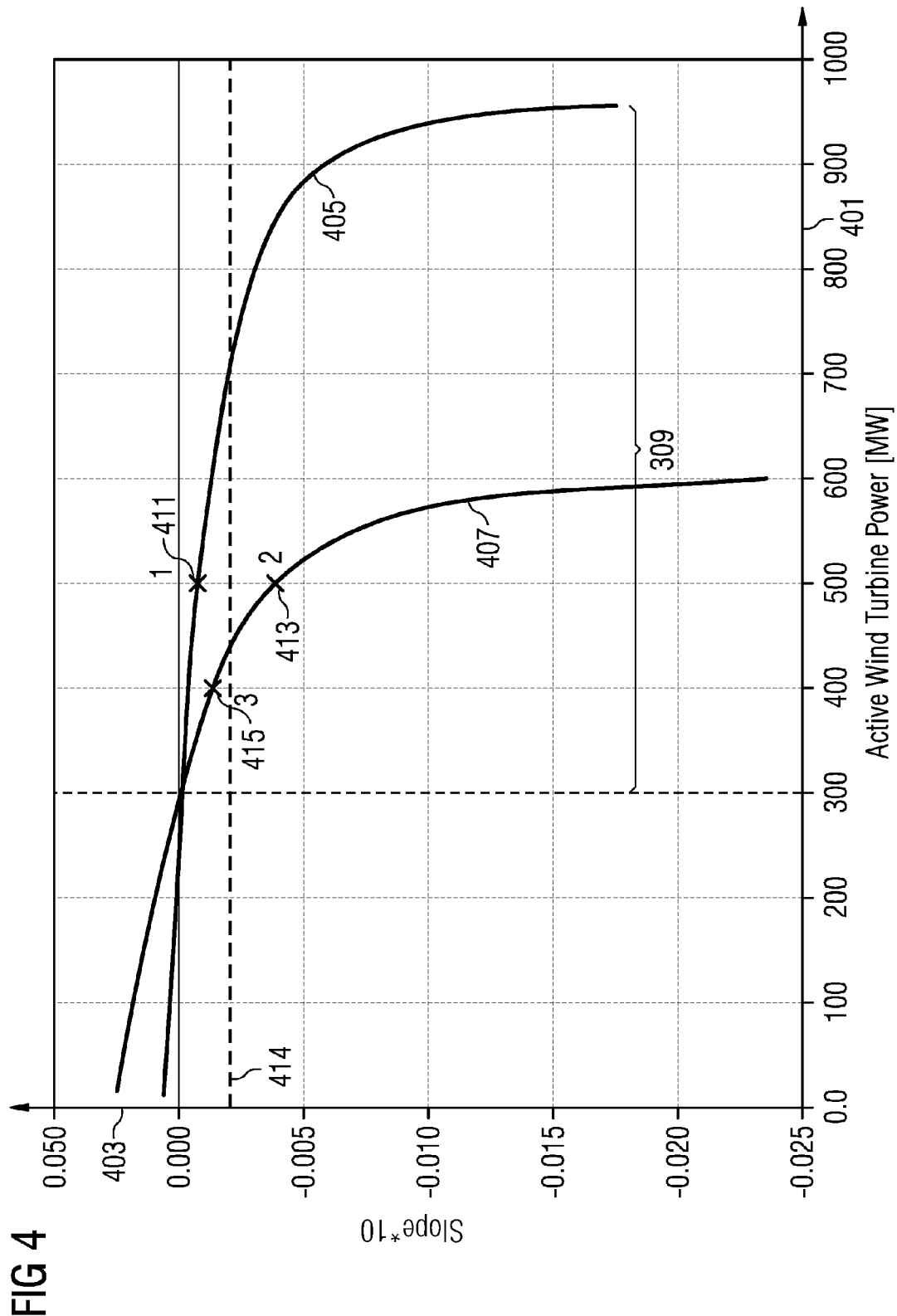

WIND TURBINE CONTROL FOR A WEAK GRID BY REDUCING ACTIVE POWER OUTPUT

CROSS REFERENCE TO RELATED APPLICATIONS

The present application claims priority to European Patent Office application No. 12167315.6 EP filed May 9, 2012, the entire content of which is hereby incorporated herein by reference.

FIELD OF INVENTION

The present invention relates to a method and to an arrangement for controlling a wind turbine, wherein based on a slope of a voltage in dependence of active power a measure is performed for stabilizing the utility grid.

BACKGROUND OF INVENTION

Wind power plants comprising a plurality of wind turbines may be placed in rural areas where wind speed is high, but where the infrastructure of the electrical power system has deficiencies. In particular, a transmission system, the transformer and the connecting cable(s) may not be stable in all situations which may result in a weak power system or weak utility grid, having a particular high grid impedance. In particular, the strength (in particular the impedance) of the power system or the utility grid may change with time. In particular, the changes may be associated with connecting or disconnecting of generator, capacitor, transmission line, cables or transformers. In particular for a utility grid having a changing impedance the voltage delivered to a point of common coupling may not be kept in a predetermined range around a rated voltage.

There may be a need for a method and for an arrangement for controlling a wind turbine, which may in particular apply to a utility grid having changing impedance, and which may result in a more stable voltage at the point of common coupling.

SUMMARY OF INVENTION

According to an embodiment of the present invention it is provided a method for controlling a wind turbine connected to a (electrical) node connected to a utility grid (delivering electric energy to consumers), wherein to the node a plurality of other wind turbines is connected, the method comprising: measuring a (physical) quantity (e.g. represented by a signal) indicative of a slope (e.g. a gradient) of a voltage at the node in dependence of active power delivered to the node (in particular from the wind turbine); determining that the slope is smaller than a negative slope limit; performing a measure, in order to increase the slope above the slope limit.

The node may also be referred to as point of common coupling. The wind turbine may comprise a generator outputting a power stream of a variable frequency to a AC-DC-AC converter which converts the variable frequency power stream to a fixed frequency power stream which may then be supplied to a wind turbine transformer which receives the energy stream at its primary side and outputs a power stream having a higher voltage than at the primary side at its secondary side. The power stream output by the wind turbine transformer may be supplied to a collector grid collecting further output streams from other wind turbines.

The collector grid may be connected to a low voltage side of a park transformer having its high voltage side connected to the point of common coupling or the node.

The quantity which indicates the slope of the voltage in dependence to the active power may be represented for example by an electrical signal or optical signal which may be for example proportional to the slope of the voltage in dependence of the active power. In particular, the slope may be a derivative (or gradient) of the voltage V in dependence of the active power P, i.e. dV/dP, or may be a ratio of a change of the voltage and a corresponding change of the active power. Alternatively, the quantity may be or may correspond or may be derived from a slope of the active power in dependence of the voltage. From the measured quantity, however, the slope of the voltage in dependence of the active power may be derived, even if the quantity itself is not equal to or proportional to the slope of the voltage in dependence of the active power.

The quantity may be based on one or more measurement values or signals which are obtained at one or plural positions between the output terminal of the wind turbine and the point of common coupling. Based on the one or more measurement values the slope of the voltage at the node in dependence of the active power delivered to the node may be derivable, in particular by taken into account or using a mathematical/physical model of electric and/or electronic components comprised in the power transmission part between the output terminal of the wind turbine and the load.

The method may comprise comparing the measured slope with the negative slope limit. Thereby, an arithmetic/logic unit may be employed. The negative slope limit may be based on experience and/or simulation. In particular, a slope being smaller than the negative slope limit may be associated with a voltage which is lower than a rated voltage. In particular, the slope may decrease for increasing active power output in a particular range of the active power output, such as e.g. in a range between 0 and 1000 MW, or in other ranges.

In particular, the relationship between the voltage at the node and the active power delivered to the node may depend on an impedance of the utility grid. Thereby, the impedance it is the complex ratio of the voltage to the current in the utility grid. Impedance possesses both magnitude and phase, In the AC utility grid there are other mechanisms impeding the flow of current besides the normal resistance of DC circuits, namely the induction of voltages in conductors self-induced by the magnetic fields of currents (inductance), and the electrostatic storage of charge induced by voltages between conductors (capacitance). The impedance caused by these two effects is collectively referred to as reactance and forms the imaginary part of complex impedance, whereas resistance forms the real part.

In particular, the higher the impedance of the utility grid the more rapidly the slope may decrease with increasing active power output.

Performing the measure may comprise controlling one or more components between the wind turbine(s) drive train(s) and the point of common coupling, such as controlling the generator of the wind turbine, controlling the converter of the wind turbine, controlling a wind turbine transformer and in particular also controlling a park transformer and also controlling a capacitor bank connected to the wind turbine(s).

Thereby, the measure is selected such that performing the measure increases the slope, in particular above the slope limit. Thereby, it may be avoided that the slope decreases further which may result in a collapse of the voltage of the utility grid. In particular, a blackout may thus be avoided.

Further in particular, the wind turbine(s) may be kept connected to the utility grid and may (albeit in a reduced amount) supply active power to the utility grid. Thus, the efficiency of the energy output by the wind turbine(s) may be improved. In particular, a situation may be avoided where the utility grid may be unstable, in particular if the slope of the voltage in dependence of the active power obtains or assumes a value, which is lower than the negative slope limit. Further, a continuous connection of the wind turbine(s) to the utility grid may be enabled, thereby maintaining active power production. Further, less blackouts may occur and the utility grid may be stabilized, in particular regarding its voltage. Further, the method may improve compliance with grid codes, because the voltage may be kept within the required limits dictated by the grid code. In particular, the method may also be applied with relatively weak utility grids. A weak utility grid is thereby understood to comprise a utility grid which has a relatively high (in particular amplitude of the) impedance.

According to an embodiment of the present invention the method further comprises obtaining another quantity indicative of the voltage at the node; determining that the voltage is smaller than a voltage limit, in particular typically 0.9 of a rated voltage (i.e. 0.9 pu), or another limit value, wherein the measure performed, in order to increase the slope above the slope limit, is adapted to increase the voltage.

The other quantity may be obtained partly from the quantity which is indicative of the slope or vice versa. In particular, measuring the quantity indicative of the slope may comprise measuring one or more voltages and measuring one or more active power values from which the slope may be derived. Thus, obtaining the other quantity may make use of the obtained or measured voltage. Obtaining the other quantity may, however, also involve performing one or more measurements at one or more locations between the output terminal of the wind turbine and the point of common coupling. Using a model or a simulation the voltage at the node may be derivable from the one or more measurement values.

In particular, the method may comprise comparing the voltage at the node with the voltage limit. The rated voltage may be the desired voltage at the node which may also be referred to as one per unit (1 pu). In particular, the voltage may increase as a consequence of performing the measure. Alternatively, the measure may be selected such that performing the measure will increase the voltage.

Thereby, a stability of the voltage of the utility grid may further be improved.

According to an embodiment of the present invention the measuring the quantity and/or the obtaining the other quantity comprises measuring the respective quantity at the node, at a wind turbine output terminal, at a high voltage side of a park transformer, at a high voltage side of a wind turbine transformer and/or at a low voltage side of a wind turbine transformer.

Using a model of the overall electrical system may enable to derive the slope as well as the voltage at the node from one or more quantities or measurement values which have been obtained or measured at one or more position apart from the node. In particular, measurement values obtained or measured in a conventional wind park or a conventional wind turbine may be utilized in order to derive the slope of the voltage at the node in dependence of active power delivered to the node. Thereby, the method may be simplified.

According to an embodiment of the present invention performing the measure comprises performing a first measure comprising changing a transformation ratio of a wind park transformer connected between a wind turbine output terminal and the node such that a voltage at the low voltage side of the wind park transformer increases, the high voltage side being connected to the node.

The transformation ratio may define a ratio of the voltage at the primary side (in particular low voltage side) and the secondary side (in particular high voltage side) of the wind park transformer. In particular, the wind park transformer may be or may comprise a tap transformer which may enable to change the transformation ratio in a simple manner Thereby, the wind turbine transformer may enable to select a particular tap position for the tapping the primary coil or primary coils or the secondary coil or secondary coils. By changing the transformation ratio such that the voltage at the low voltage side of the wind turbine transformer increases the stability of the utility grid may be improved, in particular reducing the risk of a collapse of the grid voltage.

According to an embodiment of the present invention the first measure further comprises, in order to increase the slope above the slope limit: increasing reactive power output by the wind turbine(s) using a capacitor and/or a wind turbine converter connected between a wind turbine generator and the wind turbine output terminal; and/or increasing reactive power absorbed by the wind turbine(s) using a capacitor and/or a wind turbine converter connected between a wind turbine generator and the wind turbine output terminal.

In particular, the wind turbine may comprise a capacitor or a capacitor bank including a plurality of capacitors connectable to the output terminal of the wind turbine.

The wind turbine converter may be connected to an output terminal of the generator and may comprise an AC-DC converter portion, a DC link and a DC-AC converter portion, wherein all converter portions may be controlled by associated controllers. In particular, the AC-DC converter portion and also the DC-AC converter portion may comprise a plurality of high power switches, such as isolated gate bipolar transistors (IGBTs). These transistors may be controlled via supplying respective control signals, in particular pulse width modulation signals, to their gates. By appropriately forming the control signals the power stream output at the converter may be conditioned to have a particular voltage, a particular active power and a particular reactive power. Thereby, the method may be performed by appropriately controlling conventional components.

According to an embodiment of the present invention the performing the measure comprises, if the first measure is not successful, in particular does not result in the intended increase of the slope above the slope limit, performing a second measure, comprising reducing active power output by the wind turbine, in order to increase the slope above the slope limit.

In particular, the second measure may be applied, if the impedance of the utility grid (also referred to as grid impedance) suddenly increases, in particular by a predetermined amount or above a predetermined impedance limit. Thereby, avoiding an instability of the utility grid may be improved. In particular, a collapse of the voltage of the utility grid may be avoided. While reducing the active power output the reactive power output may be maintained constant. Reducing the active power output may lead to an increase of the voltage at the node. By reducing the active power output only if the first measure is not successful, an unnecessary decrease of the active power output may be avoided. Thereby, the active power production of the wind turbine and the whole wind turbine park may be improved.

According to an embodiment of the present invention an amount of reducing the active power is based on a simulation of the wind turbine(s), a transmission line between the wind turbine output terminal and the node taking into account an impedance of the utility grid.

Thereby, the amount of reducing the active power (output by the wind turbine) may be determined such that the utility grid may be kept in a stable condition (in particular regarding its voltage), while at the same time the active power output is not reduced in an excessive way.

According to an embodiment of the present invention performing the second measure (and also performing the first measure) comprises keeping the wind turbine connected to the utility grid. Thereby, the wind turbine is constantly or continuously delivering power, in particular active power, even though possibly in a reduced extent, to the utility grid.

According to an embodiment of the present invention the performing the second measure comprises increasing the voltage at the node. Thus, it may be avoided that the voltage at the node drops or even collapses. In particular, increasing the voltage may be a result of decreasing or reducing the active power output by the wind turbine(s).

According to an embodiment of the present invention the reducing the active power output by the wind turbine is performed such that the voltage is in a predetermined range by taking into account a result of the simulation.

The predetermined range may for example be between 0.9 and 1.1 of a rated voltage (i.e. 0.9 pu to 1.1 pu). Thereby, it may be avoided that the voltage falls outside the predetermined range which may ensure proper operation of the utility grid.

According to an embodiment of the present invention the measuring the quantity and/or the obtaining the other quantity and/or the determining that the slope is smaller than a negative slope limit and/or the determining that the voltage is smaller than a voltage limit is performed repeatedly, in particular continuously or periodically with a repeating period between 1 ms and 10 s, in particular between 10 ms and 1 s.

In particular, repeatedly obtaining or measuring the quantity and/or the other quantity may be necessary when the utility grid rapidly changes with respect to the grid impedance. Thereby, controlling the wind turbine may take into account changes of the grid impedance. The quantity and/or the other quantity may be measured or obtained at consecutive time-points, for example as plural analogue or digital samples.

According to an embodiment of the present invention an increase of the impedance of the utility grid leads to a decrease of the slope, in particular in a particular range of the active power output. In particular, in a first range of the active power output the increase of the impedance of the utility grid may lead to an increase of the slope. In a second range of the active power output comprising higher active power output than the first range the increase of the impedance of the utility grid may lead to a decrease of the slope.

According to an embodiment of the present invention the method further comprises determining that the slope is equal or larger than the negative slope limit and increasing the active power output by the wind turbine.

Thus, as soon as it is determined that the slope is equal or even larger than the negative slope limit, the active power output by the wind turbine(s) may be rapidly increased, in order to increase the power output of the turbine and thus the efficiency of the whole wind turbine park.

It should be understood that features individually or in any combination disclosed, described, explained or employed for a method for controlling a wind turbine may also be applied individually or in any combination to an arrangement for controlling a wind turbine according to an embodiment of the present invention and vice versa.

According to an embodiment of the present invention it is provided an arrangement for controlling a wind turbine connectable to a node connectable to the utility grid, wherein to the node a plurality of other wind turbines is connectable, the arrangement comprising: an input terminal for receiving a measured quantity indicative of a slope of voltage at the node in dependence of active power delivered to the node; a determining section adapted to determine that the slope is smaller than a negative slope limit; and an output terminal for outputting a control signal for performing a measure, in order to increase the slope above the slope limit.

The arrangement for controlling the wind turbine may in particular be comprised or located in a wind park controller (or pilot) controlling a plurality of wind turbine comprised in the wind park. Thereby, the control signal output from the output terminal may for example relate or refer to a reference voltage, a reference power, a reference active power, a reference reactive power which may be supplied to one or more controller(s) of each individual wind turbine, in particular may be supplied to a converter of the wind turbine(s). Further, the arrangement may control a transformation ratio of the wind park transformer. Thus, according to an embodiment of the present invention a wind turbine park controller is provided comprising the arrangement for controlling the wind turbine.

Embodiments of the present invention are now described with reference to the accompanying drawings. The invention is not limited to the illustrated or disclosed embodiments.

BRIEF DESCRIPTION OF THE DRAWINGS

FIG. 2 illustrates a flow diagram of a method for controlling one or more wind turbine(s) according to an embodiment of the present invention;

FIG. 3 illustrates a graph for explaining a method according to an embodiment of the present invention; and FIG. 4 illustrates a graph for explaining a method according to an embodiment of the present invention.

Figure 1:
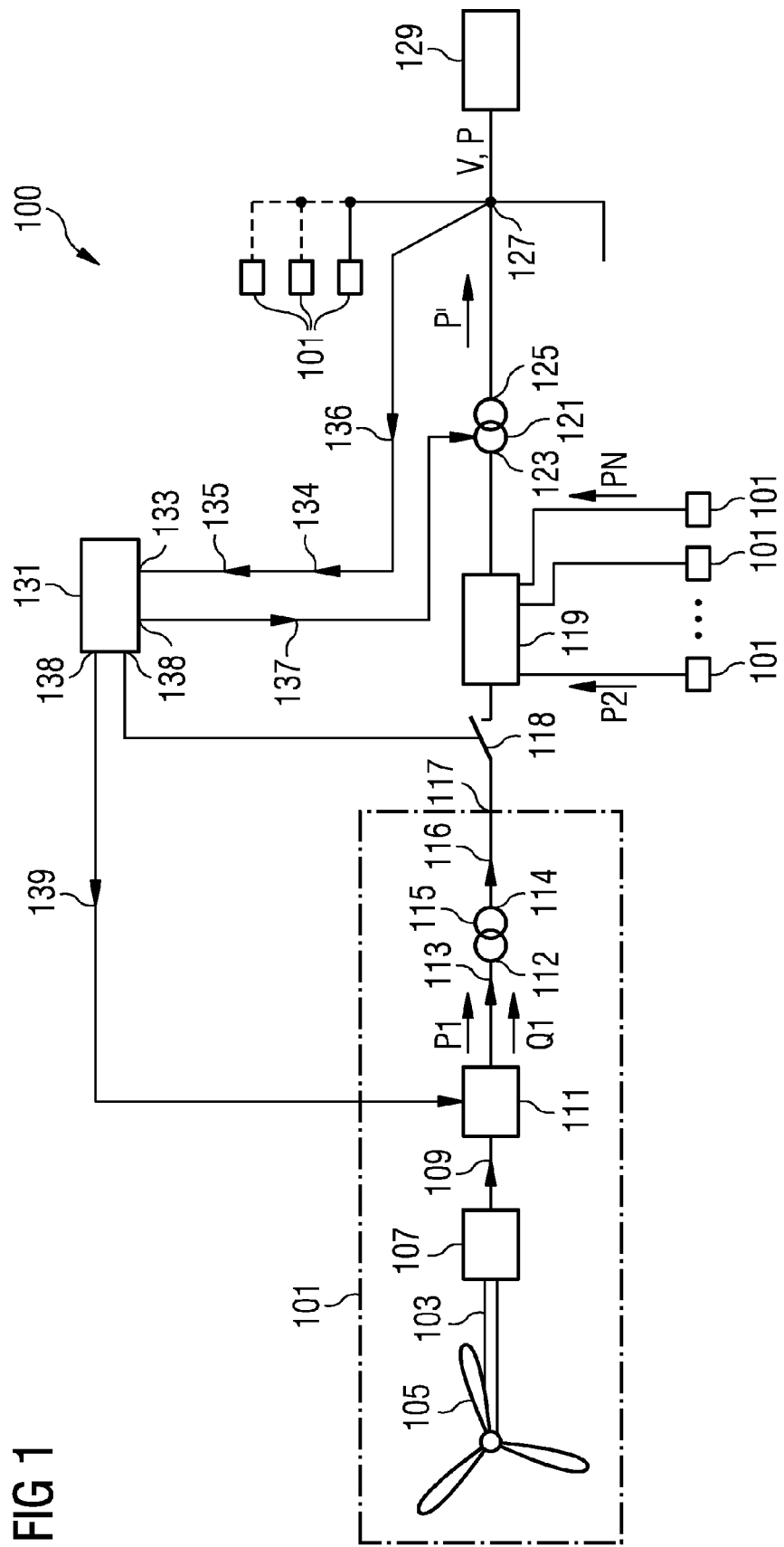
FIG. 1 schematically illustrates a wind park comprising an arrangement for controlling a wind turbine according to an embodiment of the present invention.

The wind turbine park 100 schematically illustrated in FIG. 1 comprises a number of wind turbines 101 from which only one wind turbine is illustrated in some detail. The wind turbine 101 comprises a main rotation shaft 103 to which plural rotor blades 105 are connected. The main shaft 103 is mechanically connected to the generator 107 which generates upon rotation of the main shaft 103 a power stream 109 which is supplied to a converter 111 of the wind turbine. The converter 111 converts the variable frequency power stream 109 to a fixed frequency power stream 113 (comprising active power P1 and reactive power Q1) which is supplied to a wind turbine transformer 115 which transforms the voltage of the power stream 113 to a higher voltage power stream 116 which is output at a wind turbine output terminal 117.

The power output stream 116 is supplied to a collector grid 119. The wind turbines 101 are connected through their wind turbine transformers 115 to the collector grid 119 (typical a cable network), which supplies the power stream to a wind park transformer 121 having a low voltage side 123 and a high voltage side 125.

The high voltage side 125 of the park transformer 121 is connected to a point of common coupling 127 (also referred to as a node) to which plural other wind turbines 101 are connected. The point of common coupling 127 is (potentially via another transformer which is not illustrated in FIG. 1) connected to a utility grid 129 which provides the electric energy to one or more consumers.

The wind farm 100 further comprises an arrangement 131 for controlling the wind turbine 101 and plural other wind turbines of the wind farm 100 according to an embodiment of the present invention. Thereby, the arrangement 131 is adapted to receive via an input terminal 133 a measured quantity 135 which is indicative of a slope of the voltage V at the point of common coupling 127 in dependence of the active power P delivered to the point of common coupling 127, where P is the sum of active power contributions P1, P2, . . . , PN delivered from all wind turbines 101.

The arrangement 131 comprises a determining section which is adapted to determine that the slope derivable from the quantity 135 is smaller than a negative slope limit (which may for example be stored in a storage of the arrangement 131). If this is the case the arrangement 131 outputs a control signal, such as control signal 137 and/or control signal 139, in order to perform a measure to increase the slope above the slope limit. In particular, the arrangement 131 is adapted to change via the control signal 137 a transformation ration of the wind park transformer 121 and/or to increase or decrease the reactive power output Q1 of the converter 111 and/or to decrease the active power output P1 of the converter 111 and thus of the wind turbine 101 (and/or other wind turbines of the wind park 100).

Thereby, the method as is exemplarily illustrated in FIG. 2 is performed according to an embodiment of the present invention. The method 200 comprises measuring a voltage 134 (V) at the point of common coupling 127 and also measuring an active power 136 (P) at the point of common coupling, as is also indicated in FIG. 2 by respective signals 134, 136 lead from the point of common coupling 127 to the arrangement 131.

In a method step 201 the slope 135 being equal to Δ(voltage)/Δ(active power) or dV/dP is calculated. The resulting slope 135 is supplied to a decision element 203 which decides whether the slope is smaller than a negative slope limit. If this is not the case it is branched to the path 205 leading back to the determining element 201, which then continuously or repeatedly calculates the slope.

If the decision element 203 determines that the slope is smaller than the slope limit, it is branched to the path 207 leading to the further decision element 209. The decision element 209 triggers or initiates a first measure to increase the slope, wherein the first measure may involve changing the transformation ratio of the wind park transformer 121 and/or injecting reactive power Q1 from the wind turbine 101 to the utility grid or absorbing reactive power Q1 from the utility grid. If the first measure results in increasing the slope above the slope limit, it is branched in the path 211 which leads back to the calculation element 201.

If the first measure does not result in an appropriate increase of the slope, it is blanched to a path 213 which leads to a further method step 215, wherein a second measure is performed, in order to increase the slope. In particular, the active power P1 output at the wind turbine output terminal 117 is reduced, in order to increase the slope. If this second measure results in an appropriate increase of the slope, it is branched to a path 217 leading back to the calculation step 210, which is then repeated for subsequent points in time.

If, however, reduction of the active power output P1 does not result in the required increase of the slope, it is branched to the path 219 which leads to a method step 221 in which the wind turbine 101 remains still connected to the grid but the active power is reduced by pitching the rotor blades 105.

FIG. 3 illustrates a graph, wherein an abscissa 301 indicates a sum P of active power output P1, P2, . . . by the wind turbines of the wind park 100 (or the active power delivered to the point of common coupling 127) and wherein the ordinate 303 denotes the voltage V at the point of common coupling 127. The curve 305 illustrates the case of a strong utility grid 129, whereas the curve 307 illustrates the case of a relatively weak utility grid 129.

As can be seen from FIG. 3 for increasing active power P supplied to the point of common coupling 127 the voltage V first increases, but then decreases for increasing active power. In particular, a slope of the voltage in dependence of the active power is smaller than zero in a range 309 of the active power P. As can further be seen (also referring to FIG. 4 showing the slope in dependence of the active power P), the slope of the curve 307 is smaller than of the curve 305 in the range 309.

Initially, the wind park 100 is operated according to an operating point 311 in the strong grid, wherein the active power P is approximately 500 MW (as only one example, also other power levels may apply) and the voltage is slightly below the rated voltage which appears here at the position 1.0 pu. In particular, the wind turbine is operated with a relatively strong utility grid.

Then, the impedance of the grid changes such that the curve 307 applies. Thereby, the operating point becomes the point 313 which shows a smaller slope of the voltage in dependence of the active power than the working point 311. In order to avoid collapse of the grid voltage, the active power P output by the wind turbines, in particular the active power P1 output by the wind turbine 101, is decreased in sum from around 500 MW to about 400 MW, thereby reaching the operating point 315. Thereby, the slope is decreased for stabilizing the system.

FIG. 4 illustrates on an abscissa 401 the active power P output from the wind turbines of the part 100 (or supplied to the point of common coupling 127) and on an ordinate 403 the slope of the voltage in dependence of the active power corresponding to the situation illustrated in FIG. 3.

The operating point 411 belongs to the strong utility grid, as illustrated by the curve 405. Then, the impedance of the utility grid suddenly increases such that the operating point becomes the point 413 corresponding to the operating point 313 in FIG. 3. It is apparent from FIG. 4 that the slope belonging to the point 413 is below a slope limit 414 which bears the risk that the voltage at the point of common coupling 127 collapses. In order to avoid such a collapse the active power output P is decreased such that the operating point 415 corresponding to the operating point 315 in FIG. 3 is assumed. The operating point 415 comprises a slope which lies above the slope limit 414.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A method for controlling a wind turbine connected to a node connected to a utility grid, wherein to the node a plurality of other wind turbines is connected, the method comprising:

measuring a quantity indicative of a slope of a voltage at the node in dependence of active power delivered to the node;

determining that the slope is smaller than a negative slope limit;

performing a measure, in order to increase the slope above the slope limit.

2. The method according to claim 1, further comprising:
obtaining another quantity indicative of the voltage at the node;
determining that the voltage is smaller than a voltage limit;
wherein the measure performed, in order to increase the slope above the slope limit, is adapted to increase the voltage.

3. The method according to claim 2, wherein the voltage limit is 0.95 of a rated voltage.

4. The method according to claim 2, wherein the voltage limit is 0.9 of a rated voltage.

5. The method according to claim 1, wherein the measuring the quantity and/or the obtaining the other quantity comprises measuring the respective quantity at the node, at a wind turbine output terminal, at a high voltage side of a park transformer, at a high voltage side of a wind turbine transformer and/or at a low voltage side of a wind turbine transformer.

6. The method according to claim 1, wherein performing the measure comprises performing a first measure comprising:
changing a transformation ratio of a wind park transformer connected between a wind turbine output terminal and the node such that a voltage at the low voltage side of the wind park transformer increases, the high voltage side being connected to the node.

7. The method according to claim 6, wherein the first measure further comprises, in order to increase the slope above the slope limit:
increasing reactive power output by the wind turbine using a capacitor or a wind turbine converter connected between a wind turbine generator and the wind turbine output terminal; and/or
increasing reactive power absorbed by the wind turbine using a capacitor or a wind turbine converter connected between a wind turbine generator and the wind turbine output terminal.

8. The method according to claim 6, wherein performing the measure comprises, if the first measure is not successful, performing a second measure (215), comprising:
reducing active power output by the wind turbine, in order to increase the slope above the slope limit.

9. The method according to claim 8, wherein an amount of reducing the active power is based on a simulation of the wind turbine, a transmission line between the wind turbine output terminal and the node taking into account an impedance of the utility grid.

10. The method according to claim 8, wherein performing the second measure comprises keeping the wind turbine connected to the utility grid.

11. The method according to claim 8, wherein performing the second measure comprises increasing the voltage.

12. The method according to claim 9, wherein the reducing the active power output by the wind turbine is performed such that the voltage is in a predetermined range by taking into account a result of the simulation.

13. The method according to claim 1, wherein the measuring the quantity and/or the obtaining the other quantity and/or the determining that the slope is smaller than a negative slope limit and/or the determining that the voltage is smaller than a voltage limit is performed repeatedly.

14. The method according to claim 13, wherein said repeatedly performing of the determining that the voltage is smaller than a voltage limit is performed continuously or periodically with a repeating period between 1 ms and 10 s.

15. The method according to claim 14, wherein the repeating period is between 10 ms and 1 s.

16. The method according to claim 1, wherein an increase of the impedance of the utility grid leads to a decrease of the slope.

17. The method according to claim 1, further comprising:
determining that the slope is equal or larger than the negative slope limit;
increasing the active power output by the wind turbine.

18. An arrangement for controlling a wind turbine connectable to a node connectable to the utility grid, wherein to the node a plurality of other wind turbines is connectable, the arrangement comprising:
an input terminal for receiving a measured quantity indicative of a slope of voltage at the node in dependence of active power delivered to the node;
a determining section adapted to determine that the slope is smaller than a negative slope limit;
an output terminal for outputting a control signal for performing a measure, in order to increase the slope above the slope limit.

* * * * *